(12) United States Patent
Tongue

(10) Patent No.: US 7,251,945 B2
(45) Date of Patent: Aug. 7, 2007

(54) WATER-FROM-AIR SYSTEM USING DESICCANT WHEEL AND EXHAUST

(75) Inventor: Stephen Tongue, Hampden, MA (US)

(73) Assignee: Hamilton Sandstrand Corporation, Windsor Locks, CT (US)

(*) Notice: Subject to any disclaimer, the term of this patent is extended or adjusted under 35 U.S.C. 154(b) by 217 days.

(21) Appl. No.: 11/199,979

(22) Filed: Aug. 9, 2005

(65) Prior Publication Data

US 2006/0272344 A1   Dec. 7, 2006

Related U.S. Application Data

(60) Provisional application No. 60/687,737, filed on Jun. 6, 2005.

(51) Int. Cl.
*F25D 17/02* (2006.01)
(52) U.S. Cl. .............................. 62/93; 62/271; 62/291; 95/113; 96/125
(58) Field of Classification Search ................ 62/92, 62/93, 150, 171, 177, 271, 291, 309, 310, 62/323.1, 434, 428; 95/113; 96/125, 127
See application file for complete search history.

(56) References Cited

U.S. PATENT DOCUMENTS

| | | | | | |
|---|---|---|---|---|---|
| 4,926,618 | A | * | 5/1990 | Ratliff | 95/10 |
| 5,512,083 | A | * | 4/1996 | Dunne | 95/113 |
| 5,732,562 | A | * | 3/1998 | Moratalla | 62/94 |
| 5,878,590 | A | * | 3/1999 | Kadle et al. | 62/271 |
| 6,029,462 | A | * | 2/2000 | Denniston | 62/94 |
| 6,547,853 | B2 | * | 4/2003 | Fukuhori et al. | 95/113 |
| 7,007,495 | B2 | * | 3/2006 | Lee et al. | 62/271 |
| 7,017,356 | B2 | * | 3/2006 | Moffitt | 62/91 |
| 7,077,187 | B2 | * | 7/2006 | Cargnelli et al. | 165/4 |

FOREIGN PATENT DOCUMENTS

JP          5-245333 A  *  9/1993

\* cited by examiner

*Primary Examiner*—Mohammad M. Ali
(74) *Attorney, Agent, or Firm*—Carlson, Gaskey & Olds

(57) ABSTRACT

A water production unit is provided that uses a desiccant wheel for extracting water from an air loop. A portion of the air loop is heated using exhaust from, for example, a vehicle to regenerate the desiccant wheel.

17 Claims, 2 Drawing Sheets

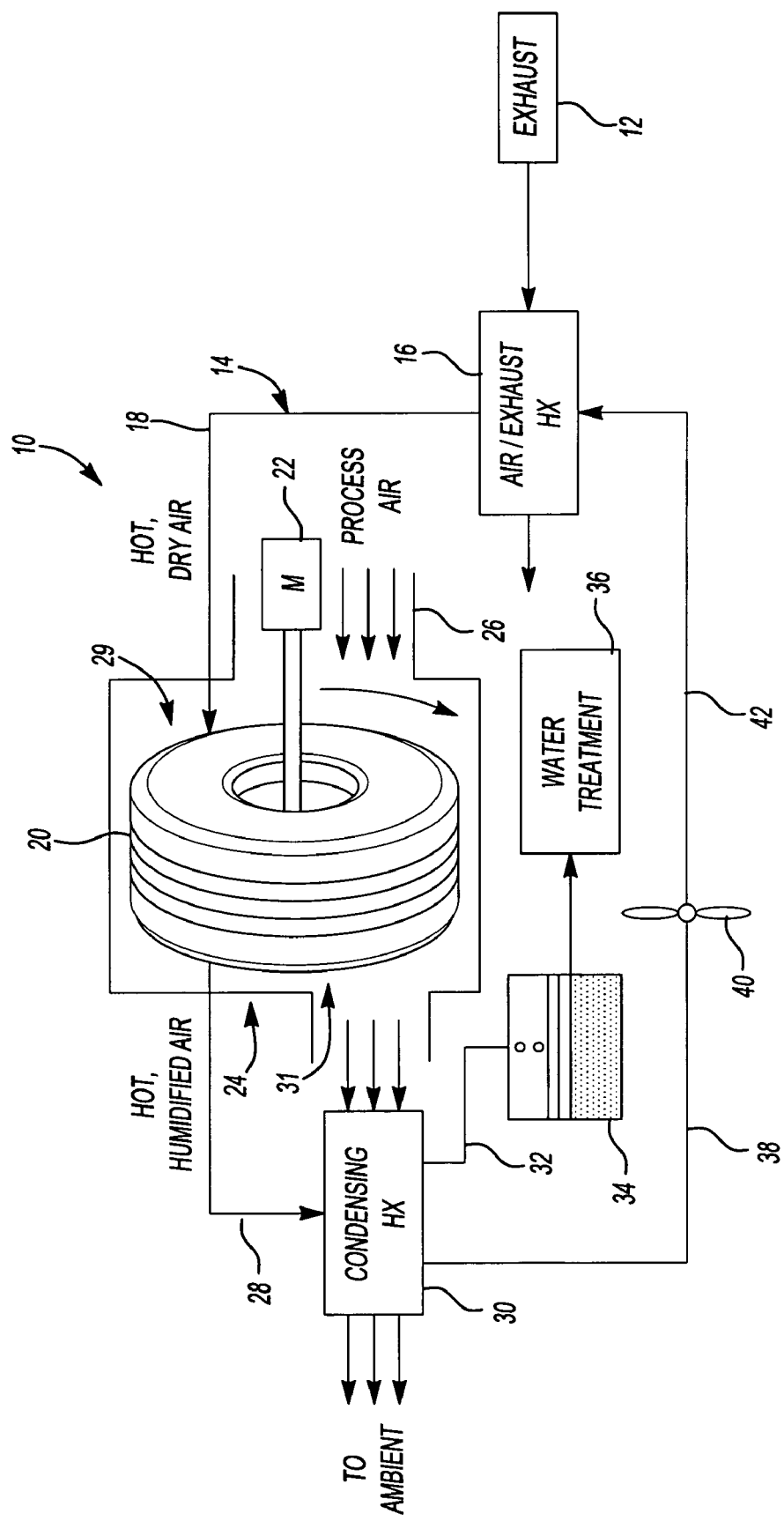

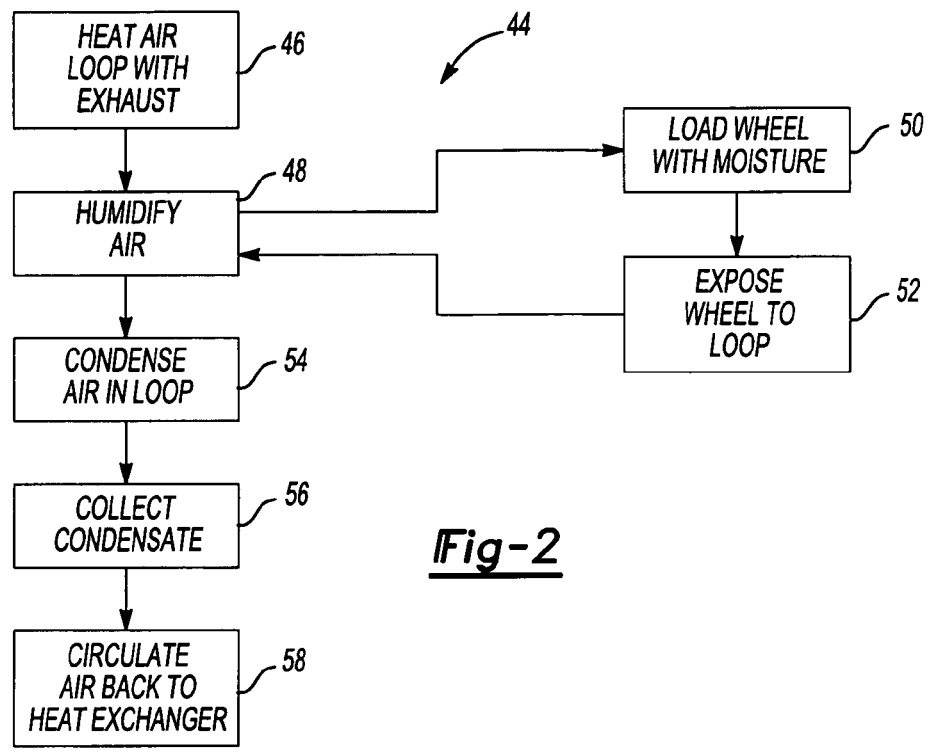
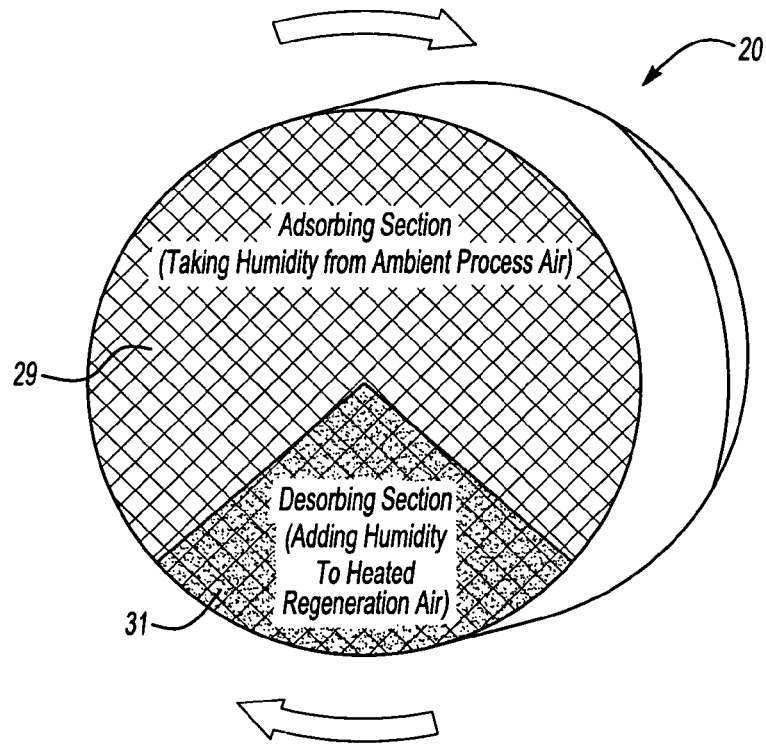

WATER-FROM-AIR SYSTEM USING DESICCANT WHEEL AND EXHAUST

The present application claims priority to U.S. Provisional Application Ser. No. 60/687,737, filed Jun. 6, 2005.

BACKGROUND OF THE INVENTION

This invention relates to a water production unit that uses engine exhaust heat or electrical power to provide the motive energy to recover water from ambient air.

There are many environments in which an engine is used where water is desired but not readily available. For example, during military campaigns water is typically brought to remote or arid regions where water is not readily available. Water must be brought along a supply line to troops, where military vehicles are often present, which is dangerous and costly. One by-product of a combustion engine is waste heat in the form of high temperature exhaust. This waste heat can be used to drive a process to recover water from ambient air. Electrical power can be used when the engine is off and waste heat is not available.

A water recovery system has been proposed to recover water from ambient air using a vehicle's exhaust heat. The propose system is suggested as an adjunct for stationary and vehicle, turbine or internal combustion engine power plants. However, any system employed in a military or similar vehicle must be highly efficient to justify the system. Further, it is desirable to have the ability to collect water under a broad range of environmental conditions, even in the arid conditions of a desert.

SUMMARY OF THE INVENTION

The present invention provides a water production unit that extracts water from air using a desiccant wheel. The unit includes an air loop having a hot, dry air passage that is in fluid communication with a humidified air passage. A rotating desiccant wheel is arranged such that a segment of the wheel is in fluid communication between the passages. The desiccant wheel has dry and moist sides. The dry and moist sides are respectively exposed to the dry and humidified air passages. The remaining portion of the desiccant wheel is adapted to be exposed to an ambient air source to load the dry desiccant material with moisture. A heat exchanger is arranged in fluid communication with the dry side to heat the air used to extract water and regenerate the desiccant wheel. In one example of the invention, the heat exchanger is exposed to an exhaust heat source, such as a vehicle exhaust, to provide heat to the dry air passage. An additional heat exchanger is arranged in fluid communication with the moist passage for condensing water from the regenerating air stream.

The inventive water production unit circulates air through an air loop. A moist desiccant wheel segment is exposed to the air loop. Water is collected from the desiccant wheel while the desiccant wheel is regenerated with heat from an exhaust source. Accordingly, the present invention provides an improved water production unit for an engine.

These and other features of the present invention can be best understood from the following specification and drawings, the following of which is a brief description.

BRIEF DESCRIPTION OF THE DRAWINGS

FIG. 1 is a highly schematic view of a of water production unit in which water is collected using a desiccant wheel.

FIG. 2 is a block diagram of a method of using the inventive water production unit.

FIG. 3 is a schematic view of the desiccant wheel.

DETAILED DESCRIPTION OF THE PREFERRED EMBODIMENT

A water production unit 10 is schematically shown in FIG. 1. The unit 10 includes an heat source 12, such as the exhaust from a vehicle, that provides heat to an air loop 14. Specifically, a heat exchanger 16 is arranged relative to the air loop 14 to heat the air within the air loop 14 using vehicle exhaust. The unit 10 may be integrated with a mobile military vehicle, and the heat source 12 may be provided by a combustion engine that propels the vehicle. The heat source may also be provided by a stationary power plant or electrical heaters.

A first passage 18 provides a dry air passage arranged downstream and in fluid communication with the heat exchanger 16. A desiccant wheel 20 is arranged downstream and in fluid communication with the first passage 18 and upstream of a second passage 28 that provides a humidified air passage.

The desiccant wheel 20 is arranged in a housing 24 and is rotated slowly about an axis by a motor 22. A controller (not shown) may be connected to the motor 22 and various sensors (not shown) to monitor the operation of the unit 10 and provide a desired output of water. The housing 24 includes ducting 26, which is used to maintain generally closed communication between the first and second passages 18 and 28 and to expose a portion of the desiccant wheel 20 to process air, such as ambient air, having moisture.

Referring to FIGS. 1 and 3, the desiccant wheel 20 is constructed from a suitable material that adsorbs and desorbs water in a desired manner. A portion of the desiccant wheel 20 exposed to the process air adsorbs moisture thereby loading the exposed portion with water. The loaded portion of the desiccant wheel 20 is slowly rotated into the air loop 14 exposing a moist side 31 to the second passage 28 and the dry side to the first passage 18. Heated air from the heat exchanger flows from the first passage 18 to the second passage 28 desorbing the moisture and regenerating the desiccant wheel 20. The regenerated desiccant wheel 20 rotates to again expose the desiccant, which has a dry side 29, to the process air where it can efficiently adsorb additional moisture. Thus, the desiccant wheel 20 continually adsorbs and desorbs moisture. The adsorb and regeneration airflows can be either parallel or countercurrent (parallel shown) depending on the desired performance.

The moist air in the second passage 28 flows to a condenser 30, which is exposed to, for example, ambient air, to produce condensate. The condensate flows through a pipe 32 into a storage container 34 from which it may receive additional processing at a water treatment device 36. Air from the condenser 30, which has been removed of water, flows back to the heat exchanger 16 through a recirculation air passage that is provided by third and fourth passages 38 and 42. A fan 40 is arranged between the third and fourth passages 38 and 42. The air loop 14 is generally considered to be a closed loop system in which the same air is circulated through the air loop 14 to pick up moisture from the desiccant wheel 20 and deliver it to the storage container 34.

The method of operation of the unit 10 is depicted in a flow chart shown in FIG. 2. The method 44 includes heating air within the air loop 14 using an exhaust source 12, as indicated at block 46. The heated air is humidified, as indicated at block 48. Specifically, a desiccant wheel 20 is loaded with moisture, as indicated at block 50. The moisture-laden desiccant wheel 20 is exposed to the air loop 14 to unload the moisture, as indicated at block 52. The moist air is condensed, as indicated at block 54. The condensate from the condenser 30 is collected by a storage container 34, as indicated at block 56. The air from the air loop 14, which has the water removed, circulates back to the heat exchanger 16 to be heated.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A water production unit comprising:
   an air loop having a dry air passage in fluid communication with a humidified air passage;
   a desiccant wheel arranged in fluid communication between the passages, the desiccant wheel having dry and moist sides, the dry and moist sides respectively exposed to the dry and humidified air passages, the desiccant wheel adapted to expose the dry side to an air source having moisture; and
   a heat exchanger in fluid communication the dry side for regenerating the desiccant wheel, the heat exchanger adapted to be exposed to regeneration heat source for providing heat to said dry air passage.

2. The water production unit according to claim 1, wherein the heat exchanger is upstream from the dry air passage, and the desiccant wheel is downstream from the dry air passage.

3. The water production unit according to claim 2, wherein a condenser is in fluid communication with and downstream from the desiccant wheel, the humidified air passage fluidly interconnecting the desiccant wheel and the condenser.

4. The water production unit according to claim 3, wherein a recirculation passage is arranged downstream from the condenser, the recirculation passage fluidly interconnecting the condenser and the heat exchanger.

5. The water production unit according to claim 4, wherein a recirculation fan is arranged in the recirculation passage for circulating air within the air loop.

6. The water production unit according to claim 3, wherein a storage container is in fluid communication with the condenser, the storage container collecting condensate from the condenser.

7. The water production unit according to claim 6, wherein a water treatment device is in fluid communication with the storage container for removing impurities from the condensate.

8. The water production unit according to claim 1, wherein the heat exchanger regenerates the desiccant wheel on the dry side, the desiccant wheel rotating from the dry side to the air source before returning to the moist side.

9. The water production unit according to claim 1, wherein the regeneration heat source is provided by exhaust heat from a mobile vehicle.

10. A method of producing water comprising the steps of:
    a) circulating air through an air loop;
    b) exposing a moist desiccant wheel to the air loop;
    c) collecting water from the desiccant wheel; and
    d) regenerating the desiccant wheel with heat from an exhaust source.

11. The method according to claim 10, wherein the air loop includes, the desiccant wheel, a heat exchanger and a condenser.

12. The method according to claim 11, wherein the exhaust source is in communication with the heat exchanger.

13. The method according to claim 12, wherein the exhaust source is a vehicle exhaust.

14. The method according to claim 10 comprising the step of adsorbing water from a process air with the desiccant wheel prior to performing step b).

15. The method according to claim 10, wherein step c) includes desorbing water from the desiccant wheel.

16. The method according to claim 15, wherein steps c) and d) are performed simultaneously in response to exposure of the desiccant wheel to heat from the exhaust source.

17. The method according to claim 10, wherein step c) includes purifying the collected water.

* * * * *

UNITED STATES PATENT AND TRADEMARK OFFICE
CERTIFICATE OF CORRECTION

PATENT NO. : 7,251,945 B2  Page 1 of 1
APPLICATION NO. : 11/199979
DATED : August 7, 2007
INVENTOR(S) : Tongue It is certified that error appears in the above-identified patent and that said Letters Patent is hereby corrected as shown below:

ON THE TITLE PAGE:

The Assignee should read as follows:

(73) Hamilton Sundstrand Corporation, Windsor Locks, CT (US)

IN THE CLAIMS:

Claim 1, Column 3, line 25: insert --with-- after "communication" and before "the"

Signed and Sealed this

Eighteenth Day of March, 2008

JON W. DUDAS
*Director of the United States Patent and Trademark Office*